(12) United States Patent
Silver et al.

(10) Patent No.: US 10,970,155 B1
(45) Date of Patent: Apr. 6, 2021

(54) ERROR REPORTING WHEN READING DATA

(71) Applicant: Amazon Technologies, Inc., Seattle, WA (US)

(72) Inventors: Brian Robert Silver, Austin, TX (US); Kun Xu, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 16/366,169

(22) Filed: Mar. 27, 2019

(51) Int. Cl.
*G06F 11/07* (2006.01)
*G06F 13/42* (2006.01)

(52) U.S. Cl.
CPC ........ *G06F 11/079* (2013.01); *G06F 11/0745* (2013.01); *G06F 11/0751* (2013.01); *G06F 11/0793* (2013.01); *G06F 13/4282* (2013.01); *G06F 2213/0026* (2013.01)

(58) Field of Classification Search
CPC .... G06F 11/07; G06F 11/079; G06F 11/0745; G06F 11/0793; G06F 3/04883
See application file for complete search history.

(56) References Cited

U.S. PATENT DOCUMENTS

| | | | | |
|---|---|---|---|---|
| 9,454,421 B2* | 9/2016 | McClain | ............. | G06F 11/0772 |
| 9,588,891 B2* | 3/2017 | Atkisson | ............... | G06F 12/126 |
| 9,684,461 B1* | 6/2017 | Dodson | ................. | G06F 3/0658 |
| 9,892,066 B1* | 2/2018 | Dodson | ................... | G06F 13/38 |
| 10,120,590 B2* | 11/2018 | McClain | ............. | G06F 11/0772 |
| 10,157,152 B2* | 12/2018 | Park | ....................... | G06F 3/0658 |
| 10,176,125 B2* | 1/2019 | Dodson | ................ | G06F 3/0608 |
| 10,552,048 B2* | 2/2020 | Um | ........................ | G06F 11/14 |
| 2008/0151992 A1* | 6/2008 | Chuang | ............. | H04N 21/4147 375/240.01 |
| 2017/0090781 A1* | 3/2017 | McClain | ............. | G06F 11/0772 |
| 2018/0121375 A1* | 5/2018 | Dodson | ................ | G06F 3/0685 |
| 2019/0212920 A1* | 7/2019 | McClain | ............... | G06F 3/0653 |

OTHER PUBLICATIONS

US 10,852,937 B2, 12/2020, Lapp (withdrawn)*

* cited by examiner

*Primary Examiner* — Kamini B Patel
(74) *Attorney, Agent, or Firm* — Kilpatrick Townsend & Stockton LLP

(57) ABSTRACT

System and method for performing a read transaction between a requester device, such as a host processor, and a completer device, such as a peripheral device. A device driver operating on the requester device receives a read request including a target address at which target data is to be read on the completer device. The length of the read request is increased from an initial length by an additional length for exchanging information with the completer device. The completer device generates and sends a read response comprising the target data and information about the target data. The length of the target data is equal to the initial length and the length of the information about the target data is less than or equal to the additional length. The device driver receives the read response and performs a resolution operation.

20 Claims, 10 Drawing Sheets

ERROR REPORTING WHEN READING DATA

BACKGROUND

Communication over a Peripheral Component Interconnect (PCI) interface can be subject to errors in the communicated data. For example, when an application wants to read information from a peripheral device over a PCI interface, there is a possibility that the read request can fail due to corruption of the data or other issues. The PCI mechanisms to address the failure may not take into account whether such a failure is fatal to the application. In one example, the PCI failure can be propagated to the operating system, which can determine that the failure is such that the entire system needs to shut down.

One PCI mechanism to address the failure is for the PCI controller to "poison" the data when it is determined that the data contains an error by replacing the data containing the error with an error indicator (e.g., 0xDEADBEEF) in the response to the application. The application must then verify the presence of the error indicator and subsequently determine what actions to perform to recover from the error, which may or may not be done transparently to the operating system.

This approach has several downsides, including that it is time-consuming and process-intensive. Not only must each segment of the data be analyzed for the presence of the error indicator, but the PCI controller must be queried by the application to determine whether the controller found an error indicator. The complexity of this approach is further increased due to the possible ambiguity between the actual data and the error indicator (e.g., it is possible that the actual data is similar and/or identical to the error indicator). The entirety of the data must therefore be analyzed for the presence of legitimate error indicators.

BRIEF DESCRIPTION OF THE DRAWINGS

Various examples in accordance with the present disclosure will be described with reference to the drawings, in which.

DETAILED DESCRIPTION

Figure 1:
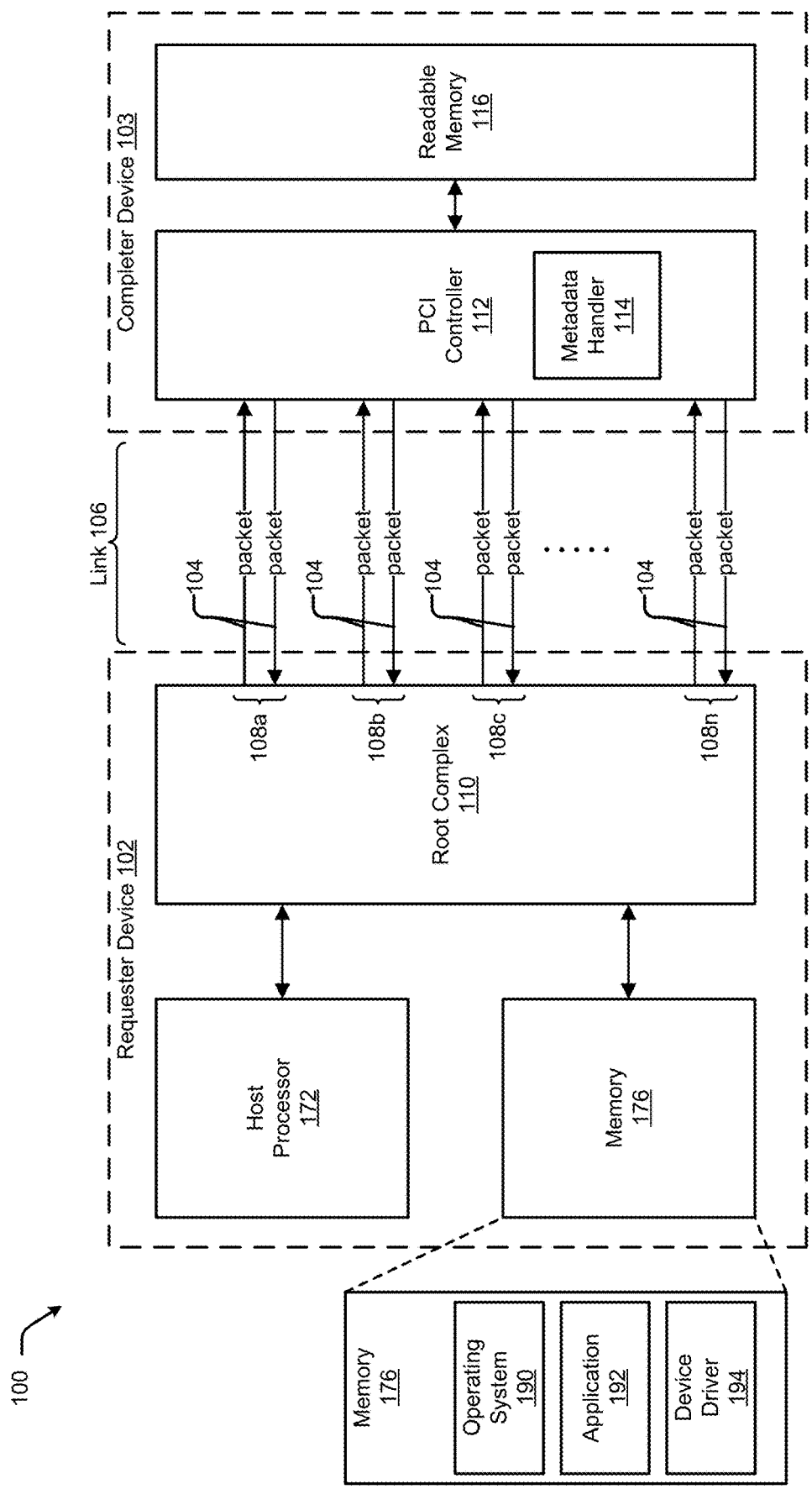
FIG. 1 illustrates an example of a computing system for performing a read transaction between a requester device and a completer device.

Computing systems can include peripheral devices. A peripheral device is a device that can extend, adapt, and/or modify the functionality of the computing system. For example, peripheral devices may provide storage, network connectivity, and/or audio and video support to a computing system. Peripheral devices may be connected to a computing system internally or externally, and can communicate with a computing system through one or more busses. The manner in which data is transferred on a bus can be defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

During operation of a computing system, different transactions such as read transactions and write transactions are performed between two (or more) devices. Each transaction may take place along a PCI interface between the two devices, which may include a host processor and a peripheral device, two host processors, or two peripheral devices, among other possibilities. Read or write transactions may take place between two peripheral devices as it may be desirable for one peripheral device to be able to use the resources of another peripheral device. For example, a computing system may include multiple PCI-based peripheral devices, each hosting a graphics processing unit (GPU). In such systems, mathematical operations can be executed on multiple GPUs in parallel. When multiple GPUs are operating on the same data, one GPU may need access to the memory of another GPU to, for example, provide computational results or to obtain computational results. Other examples include networking applications, where a network interface card may transmit transactions directly to another network card. Other examples include storage applications, where one storage interface card may read and write directly to another storage interface card. Other examples include network security applications, where one encryption card can encrypt data on a different encryption card.

In some instances, when an application wants to read in information over a PCI interface, there is a possibility that the read request can fail. As mentioned above, the PCI failure can be propagated to the operating system, which can determine that the failure is such that the entire system needs to shut down.

Techniques described herein address these and other issues by enabling a PCI device to provide information about a transaction in data sent from the device to an application. These techniques include increasing the size of a read request prior to sending the read request to the peripheral device. For example, a device driver that manages communications with the peripheral device may receive a read request from an application that is 64 bytes in length. In this example, the device driver can change the length from 64 bytes to 68 bytes, an increase in length that is expected by the peripheral device or which is programmed into the peripheral device in advance. In this and other examples, the peripheral device understands to read only 64 bytes, and to provide information about the transaction and/or target data to be read in the additional 4 bytes. For example, the peripheral device can provide information about any errors in the target data being requested (e.g., the quantity of errors in the target data, an address for each of the errors in the target data, a type for each of the errors in the target data). In some instances, the peripheral device can provide other information about the target data or the read request. The data that the peripheral device provides in a read response can thus include the data that was requested to be read, as well as some information about the read request.

The techniques discussed herein can provide a simple and flexible mechanism by which a device (e.g., a PCI device, including a peripheral device or root complex) can report issues with read transactions, as well as provide other information. The read data need not be searched for an error marker, nor does it need to be determined whether the marker indicates an error or is legitimate data. Additionally, the mechanism makes use of the format provided by a bus protocol, such as PCI, so that a sideband communication channel is not needed. Moreover, the bus protocol need not be modified, so that any system that implements the techniques discussed herein can remain compliant with the protocol.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

FIG. 1 illustrates an example of a computing system 100 for performing a read transaction between a requester device 102 and a completer device 103. The requester device 102 may be coupled to the completer device 103 by a link 106. The link 106 may be a direct or indirect link (e.g., having one or more intermediary devices) and may, in some examples, comprise multiple wires 104 forming multiple lanes 108a-108n. The link 106 can also be implemented using a switch. Each of the lanes 108a-108n may enable full-duplex or half-duplex operation. For example, each of the lanes 108a-108n may be comprised of two wires 104 that operate as two differential signaling pairs, with one pair for sending data and the other pair for receiving data. In other words, each wire 104 illustrated in FIG. 1 may comprise two wires such that each lane may comprise four wires total. In some examples, each of the lanes 108a-108n is comprised of a single wire. The link 106 may enable information-carrying packets to be transmitted along one or more of the wires 104 such that packets may be communicated between the requester device 102 and the completer device 103.

The requester device 102 may include a host processor 172, a root complex 110, and a memory 176. The memory 176 may have various instructions stored thereon corresponding to an operating system 190, an application 192, and a device driver 194. By retrieving and running the instructions stored on the memory 176, the host processor 172 may enable simultaneous or sequential operation of the operating system 190, the application 192, and the device driver 194. In some examples, operation of the operating system 190 may be initiated upon the requester device 102 (or the computing system 100) being powered on. In some examples, operation of the application 192 may be initiated by the operating system 190. In some examples, operation of the device driver 194 may be initiated by the application 192 or the operating system 190.

The completer device 103 may include a PCI controller 112 and a readable memory 116. The PCI controller 112 may access the readable memory 116 at one or more target memory addresses to retrieve the data stored therein. Optionally, the PCI controller 112 may include a metadata handler 114 or may be coupled to the metadata handler 114, which may be implemented in software and/or hardware and may cause one or more operations to be performed at the completer device 103 based on the additional data contained in the read request.

In various examples, the root complex 110 may be coupled to the host processor 172 or may be incorporated into the host processor 172. Various steps of a read transaction may be performed conjunctively by the host processor 172 and the root complex 110 while executing instructions contained in the application 192 and the device driver 194. For example, the application 192, being operated on the host processor 172, may generate a read request and send the read request to the device driver 194, being operated on the host processor 172 and/or the root complex 110. As described herein, the device driver 194 may modify the read request and subsequently send the read request to the PCI controller 112. The PCI controller 112 may retrieve the data at a target address at readable memory 116 as indicated in the read request, generate a read response containing the retrieved data as well as error data regarding the retrieved data, and send the read response to the device driver 194 operating on the host processor 172 and/or the root complex 110. The device driver 194 may read the error data and determine which resolution operation to perform (e.g., send a second read request) based on the error data. Although the embodiment of FIG. 1 depicts the root complex 110 as part of the requester device 102 and the memory 116 as part of the completer device 103, in some cases the root complex 110 could serve as the completer device and an end point device could serve as the requestor device. This could arise if, for example, a PCI endpoint reads memory that is connected to the root complex 110.

Figure 2:
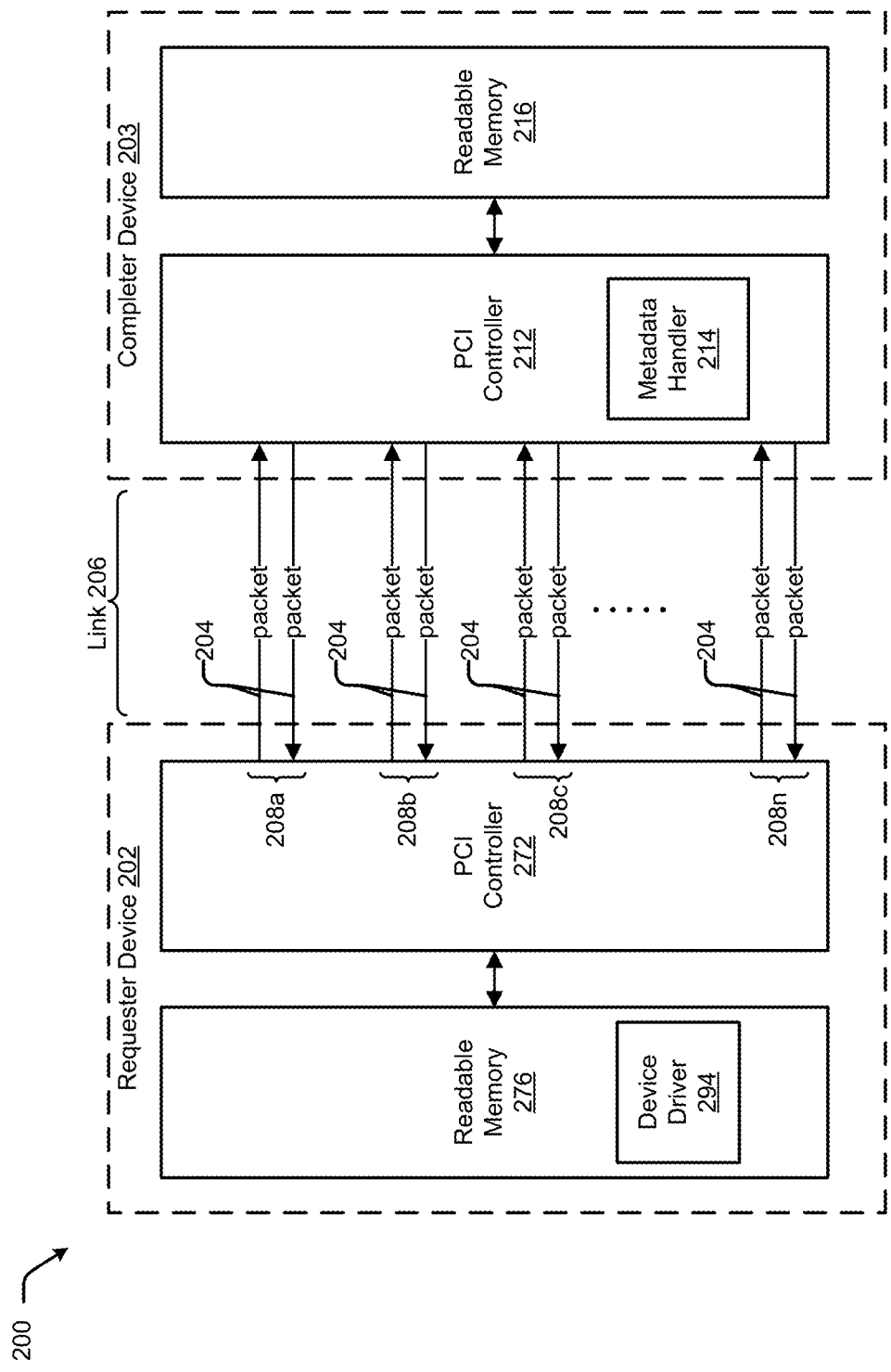
FIG. 2 illustrates an example of a computing system for performing a read transaction between a requester device and a completer device where both devices are peripheral devices such as PCI endpoints.

FIG. 2 illustrates an example of a computing system 200 for performing a read transaction between a requester device 202 and a completer device 203 where both devices are peripheral devices such as PCI endpoints. The requester device 202 may be directly or indirectly coupled to completer device 203 by a link 206 (implemented using a switch) comprising one or more wires 204 forming one or more lanes 208a-208n. Each of the lanes 208a-208n may enable full-duplex or half-duplex operation. The link 206 may enable information-carrying packets to be transmitted along one or more of the wires 204 such that packets may be communicated between the requester device 102 and the completer device 103.

The requester device 202 may include a PCI controller 272 and a readable memory 276. The readable memory 276 may have various instructions stored therein corresponding to, for example, an operating system, an application, and/or a device driver 294. In some examples, while the PCI controller 272 is executing instructions corresponding to the device driver 294 stored on the readable memory 276, the device driver 294 a may receive a read request. The device driver 294 may modify the read request and subsequently send the read request to the PCI controller 212 of the completer device 203 via the link 206. The PCI controller 212 may retrieve the data at a target address at a readable memory 216 as indicated in the read request, generate a read response containing the retrieved data as well as error data regarding the retrieved data, and send the device driver 294. The device driver 294 may read the error data and determine which resolution operation to be perform (e.g., send a second read request) based on the error data.

FIGS. 3A-3E illustrate example steps for performing a read transaction between a requester device 302 and a completer device 303, such as the request devices and the completer devices discussed above.

Figure 3A:
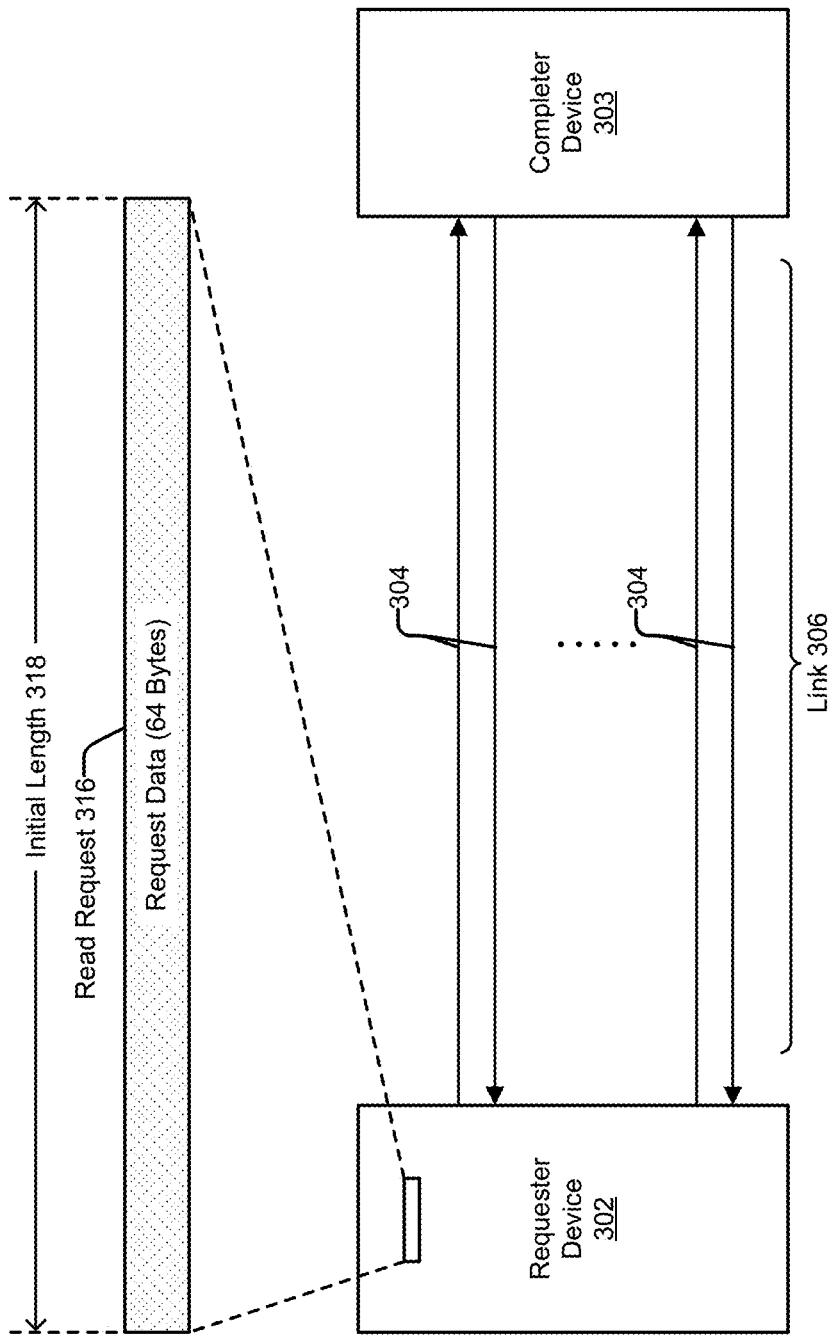
FIG. 3A illustrates an example of a read request being received by a requester device.

FIG. 3A illustrates an example of a read request 316 being received by the requester device 302. The read request 316 is received by the requester device 302 prior to being sent to a completer device 303 via one or more wires 304 of a link 306. In some examples, the read request 316 is received by a device driver operating on the requester device 302. The read request 316 may have an initial length 318 defining the amount of data to be read 316 (e.g., 64 bytes). The read request 316 may include a target address at which target data is to be read on the completer device 303. The read request 316 may further indicate the amount of data to be read at the target address (e.g., the number of double words). In some instances, the read request 316 may indicate multiple target addresses and the amount of data to be read at each of the target addresses. In various examples, the read request 316 may include one or more of: a field identifying the packet as a read request, a requester ID (corresponding to the requester device 302), a completer ID (corresponding to the completer device 303), a tag that functions as a tracking number that may be copied to the read response, and the like.

Figure 3B:
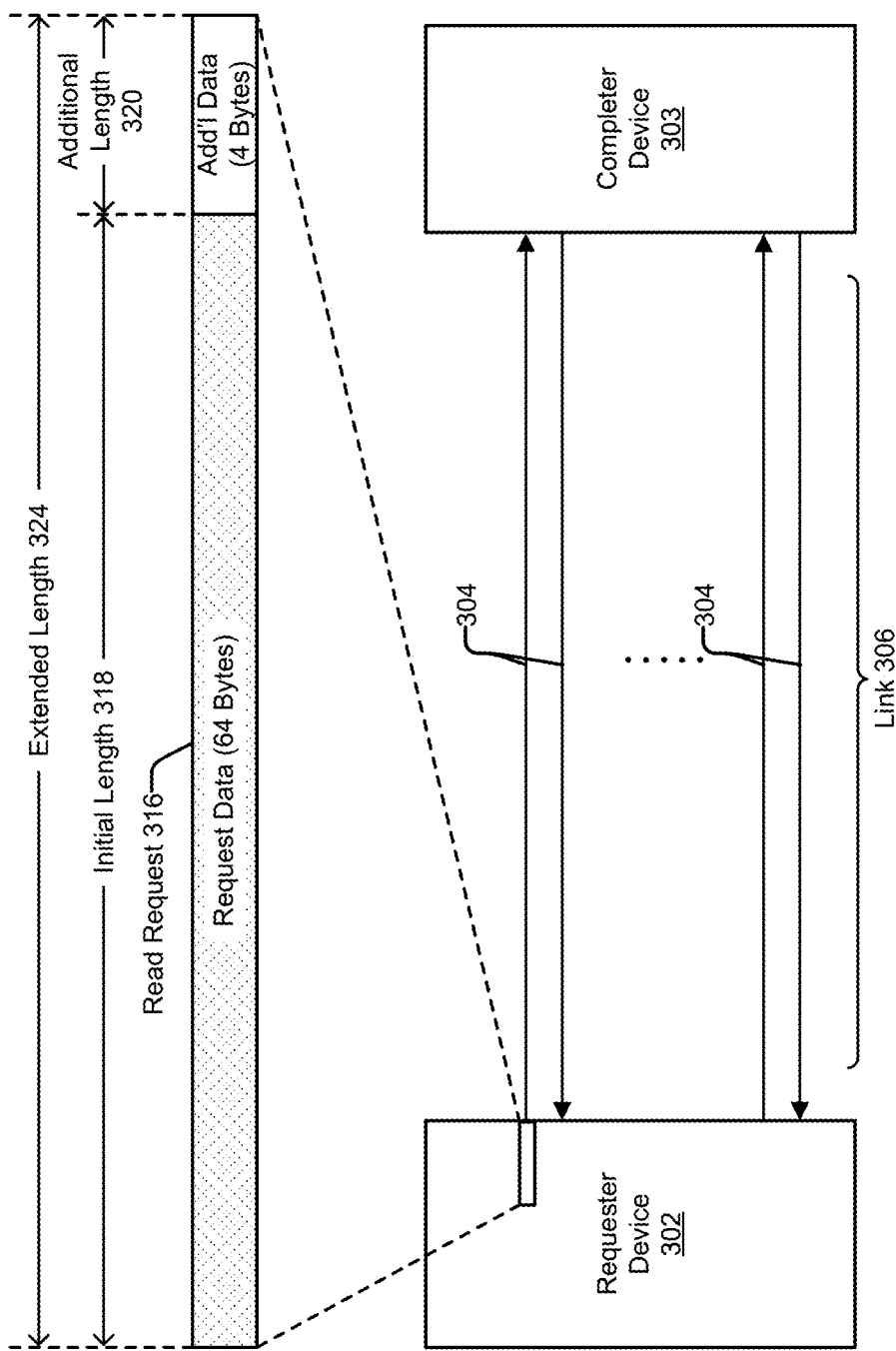
FIG. 3B illustrates an example of a read request being modified and sent by a requester device.

FIG. 3B illustrates an example of the read request 316 being modified and sent by the requester device 302. Prior to being sent to completer device 303 via one or more wires 304 of the link 306, the read request 316 is modified by the device driver operating on the requester device. The device driver can increase the initial length 318 of the data to be read by the read request 316 by an additional length 320 (e.g., 4 bytes in the illustrated example), so that the read request 316 is sent with an extended length 324. The size of the additional length 320 can be defined in advance, for example by being hardcoded into the requester device 302 and the completer device 303 or by being programmed into boot code or firmware for the requester device 302 and the completer device 303. Alternatively or additionally, the size of the additional length 320 can be configured by software executable by a host processor (such as an operating system or a device driver, among other examples). Though illustrated in FIG. 3B as being additional length 320 added to the end of the initial length 318, the bytes represented by the additional length 320 can be located anywhere else within the data that is read, such as at the beginning or somewhere in the middle.

Figure 3C:
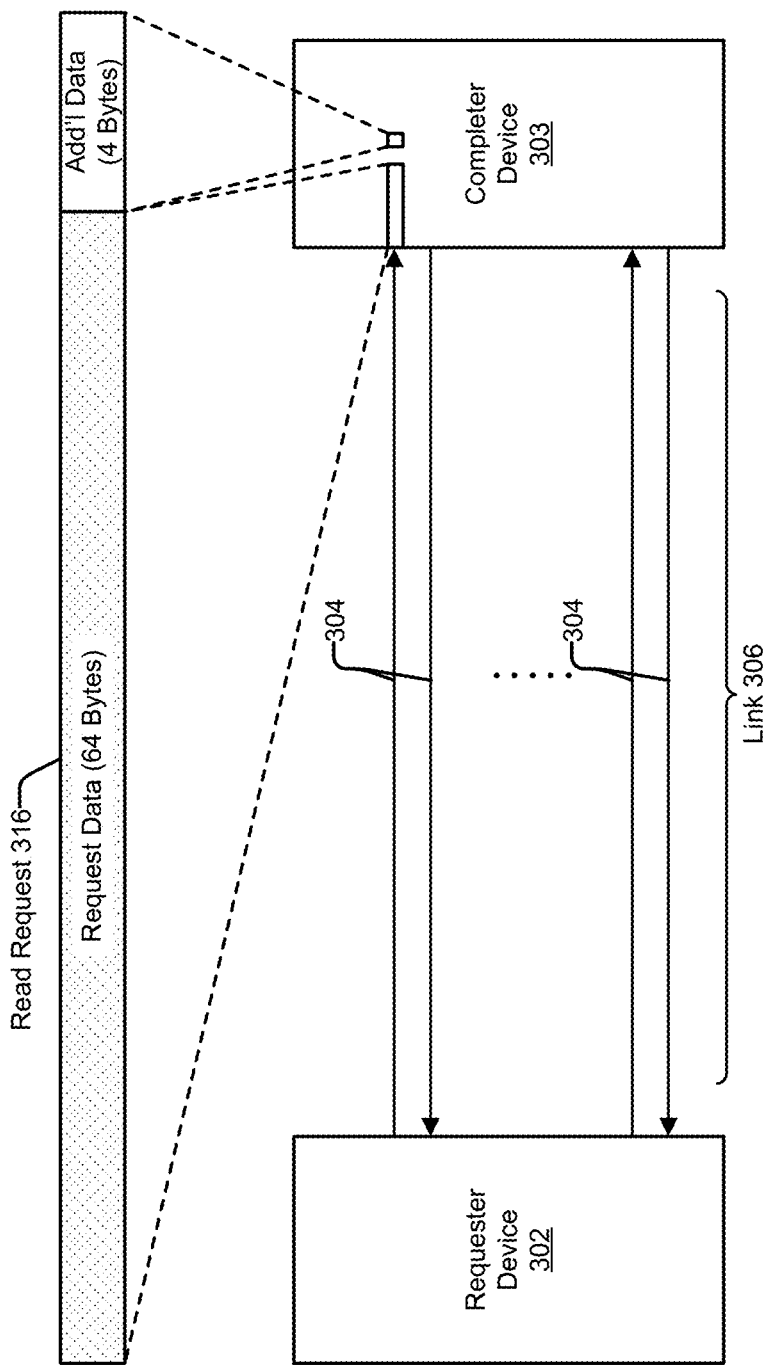
FIG. 3C illustrates an example of a read request being received by a completer device.

FIG. 3C illustrates an example of the read request 316 being received by the completer device 303 (e.g., by a PCI controller of the completer device 303). The read request 316 can be sent by a requester device 302 to the completer device 303 via one or more wires 304 of the link 306. Upon receiving the read request 316, the completer device 303 (e.g., the PCI controller) can assume that the length included in the read request 316 has been extended by some amount (e.g., 4 bytes). The completer device 303, for example, can be configured to make this assumption. In some examples, the completer device 303 can be configured at any time to expect read requests with an extended length, and can be configured at a later time to expect requests without an extended length.

The completer device 303 can execute the read request 316, and read some data either from a local memory of the completer device 303 and/or from a location outside the completer device 303. In executing the read request 316, the completer device 303 will read an amount of data equal to the initial length 318 of the read request 316. In various examples, the completer device 303 can further append some data to the data that is read. This data can be, for example, error information when the reading the data result in an error, a quantity of errors in the target data, an address for an error in the target data, a type of an error, and/or other information about the read request 316.

Figure 3D:
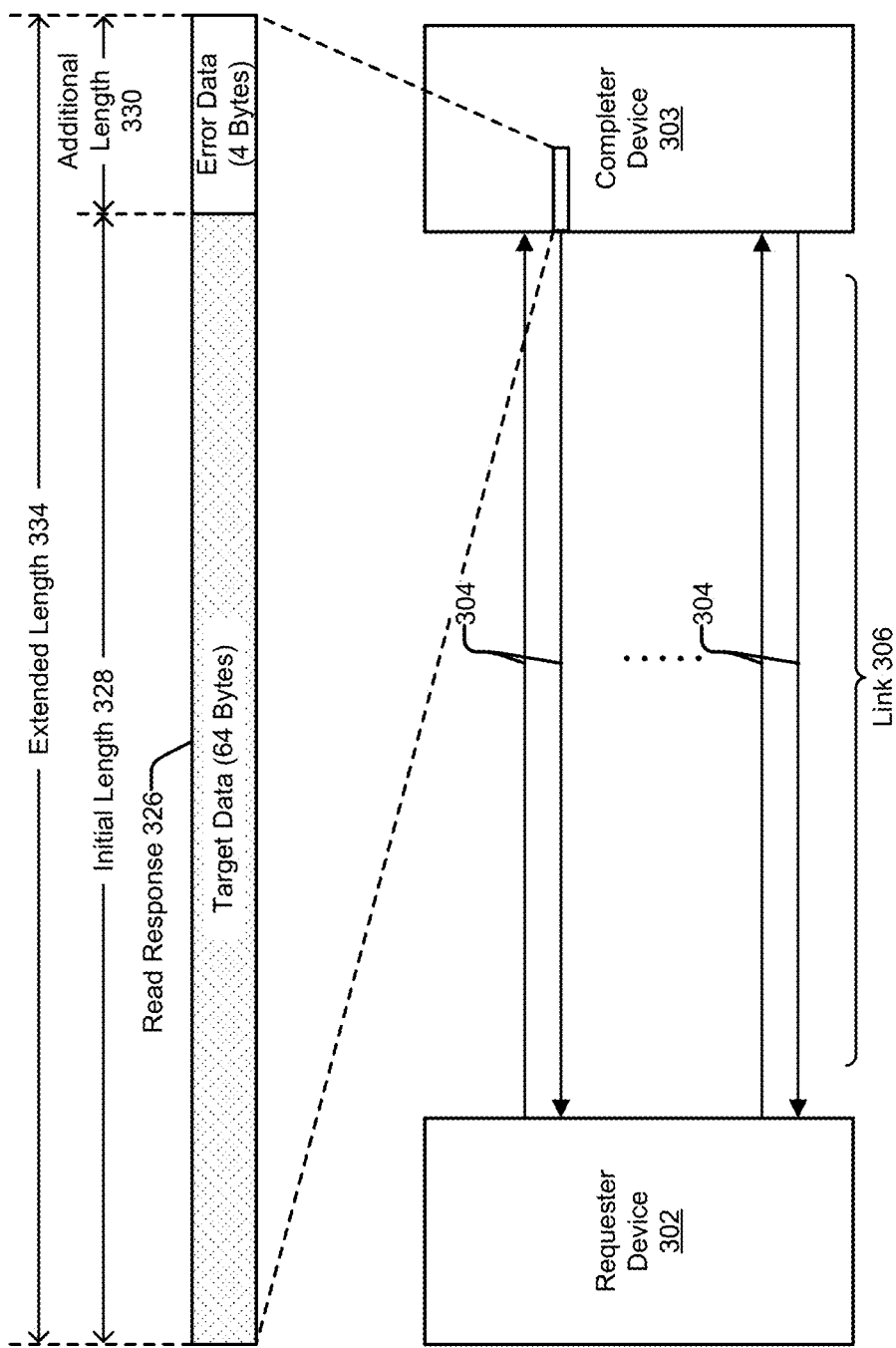
FIG. 3D illustrates an example of a read response being generated and sent by a completer device.

FIG. 3D illustrates an example of a read response being generated and sent by the completer device 303. The read response 326 may be constructed by the completer device 303 (e.g., the PCI controller) to include the target data read at the target address and additional data. In some examples, the target data has an initial length 328 that is the same as the initial length with which the read request 316 was originally initiated. In some examples, the additional data has an additional length 330 that is the same as the additional length of the additional data in the read request. In some implementations, the overall length of the read response 326 (e.g., the extended length 334), is such that the read response 326 has the same length as the length included in the read request 316 when the read request 316 was actually sent. Upon generating the read response 326, the completer device 303 may send the read response 326 to the requester device 302 via one or more wires 304 of the link 306.

Figure 3E:
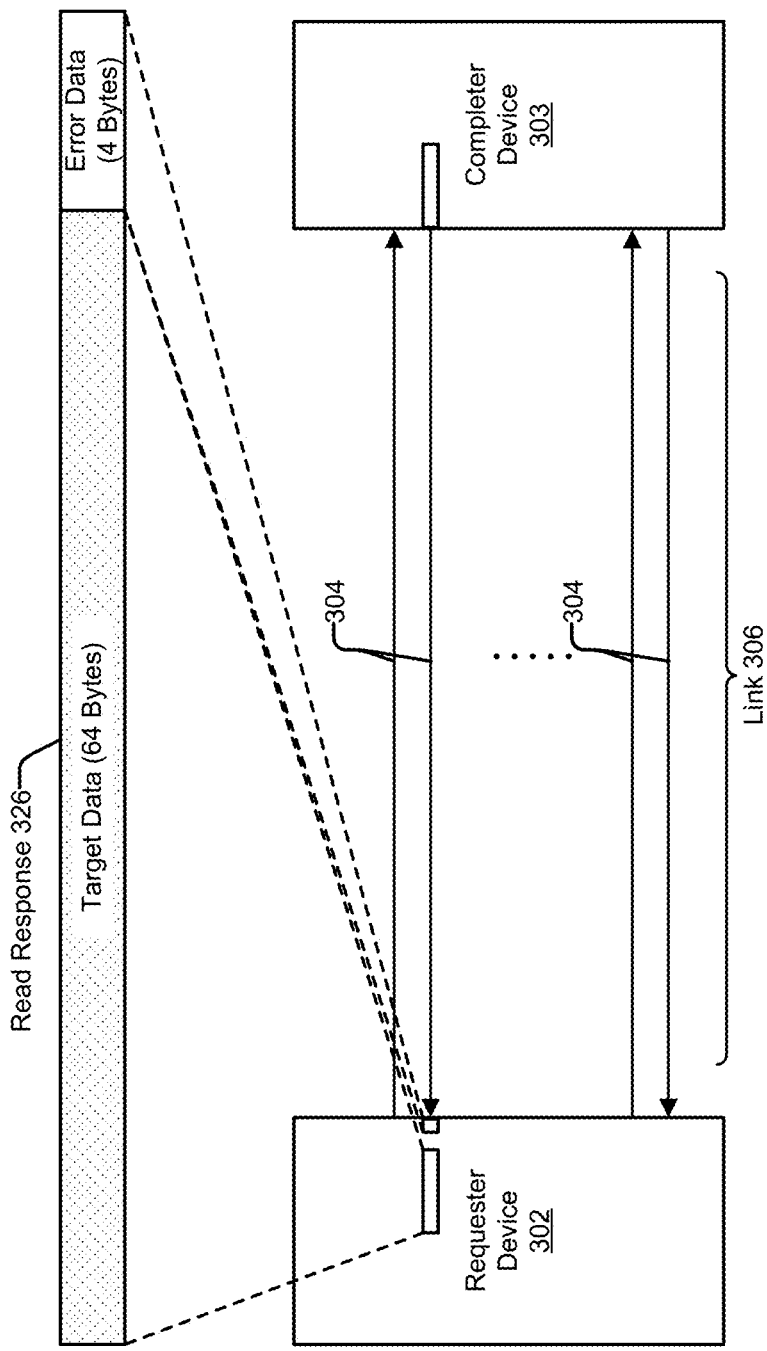
FIG. 3E illustrates an example of a read response being received by a requester device.

FIG. 3E illustrates an example of the read response 326 being received by the requester device 302 (e.g., by a device driver operating on the requester device 302). The read response 326 may be sent by a completer device 303 to the requester device 302 via one or more wires 304 of the link 306. Upon receiving the read response 326, the requester device 302 (e.g., the device driver) may analyze the read response 326 to determine whether it includes the additional data by, for example, determining the length of the read response 326 (i.e., whether the read response 326 has an initial length or an extended length). In some examples, the requester device 302 (e.g., the device driver) may partition the read response 326 into two components, a first component comprising the target data and a second component include the additional data. The additional data may be read by the requester device 302 (e.g., the device driver) and, when the additional data is error data, the requester device 302 may perform a resolution operation based on the error data. The resolution operation may include one or more of: sending a second read request for the target data to the completer device 303 via the link 806, sending a second read request for the target data to a second completer device via a second link, sending the error data to the application, notifying the application that the error data was received from the completer device 303, and modifying the target data based on the error data.

Figure 4:
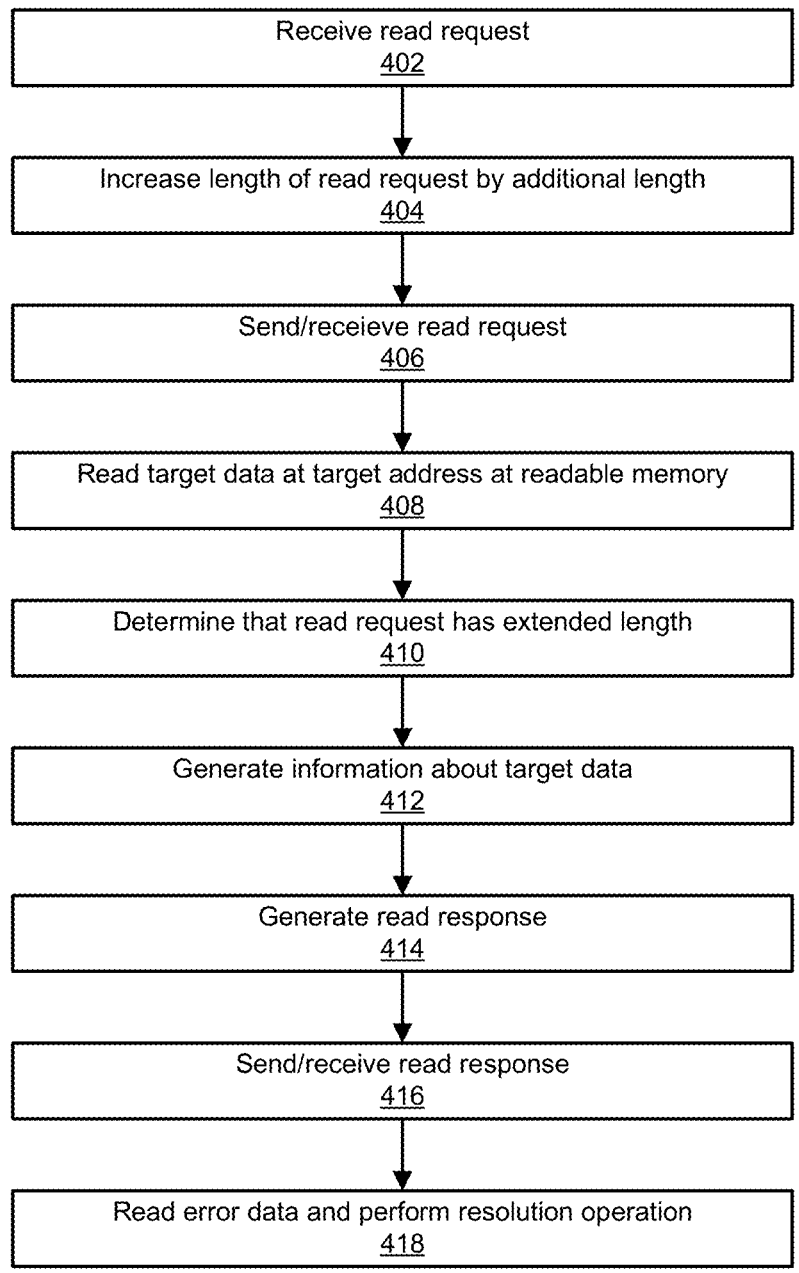
FIG. 4 illustrates an example of a method for performing a read transaction via a link between a requester device and a completer device.

FIG. 4 illustrates an example of a method 400 for performing a read transaction via a link between a requester device and a completer device. The requester device may include a host processor and the completer device may include a peripheral device. Alternatively, the request device may include a first peripheral device and the completer device may include a second peripheral device. One or more steps of method 400 may be performed in an order different than that shown in the illustrated example, and one or more steps of method 400 shown in the illustrated example may be omitted during performance of method 400.

At step 402, a read request is received by a device driver operating on the requester device. The read request can include a target address at which target data is to be read on the completer device. The read request may have an initial length.

At step 404, the length of the read request is increased by an additional length causing the read request to have an extended length that is greater than the initial length. The additional length may be for exchanging information with the completer device. For example, the additional length may be for information about the target data that is being read, such as information regarding a location or quantity of one or more errors in the target data.

At step 406, the read request is sent by the device driver to a controller of the completer device and/or the read request is received by the controller from the device driver.

The read request may be sent and/or received via the link over a single wire or over multiple wires. The requester device and the completer device may be directly or indirectly electrically coupled to each other.

At step 408, the target data is read by the controller at the target address at a readable memory of the completer device.

At step 410, it is determined, by the controller, that the read request has an extended length. The controller may determine what kind of information about the target data is to be generated based on the extended length. The information about the target data may be error data, such as, information regarding one or more errors contained in the target data or associated with the retrieval of the target data.

At step 412, the information about the target data is generated by the controller based on an analysis of the target data and/or an analysis of the retrieval of the target data. The information about the target data may include a quantity of errors in the target data, an address for each of the errors in the target data, a type for each of the errors in the target data, among other possibilities.

At step 414, the read response is generated by the controller. The read response may include the target data and the information about the target data (e.g., the error data). In some examples, the target data has a length that is equal to the initial length of the read request and the information about the target data has a length that is equal to the additional length of the read request. In such examples, the total length of the read response (i.e., the extended length of the read response) may be equal to the total length of the read request (i.e., the extended length of the read request).

At step 416, the read response is sent by the controller to the device driver and/or the read response is received by the device driver from the controller. The read response may be sent and/or received via the link over a single wire or over multiple wires.

At step 418, the information about the target data (e.g., the error data) is read by the device driver. Prior to sending the target data to an application operating on the requester device, the device driver may perform a resolution operation based on the information about the target data (e.g., the error data). The resolution operation may include one or more of: sending a second read request for the target data to the completer device via the link, sending a second read request for the target data to a second completer device via a second link, sending the information about the target data to an application, notifying the application that the information about the target data was received from the completer device, and modifying the target data based on the information about the target data. In some examples, after performing the resolution operation, the target data may be sent by the device driver to the application.

Figure 5:
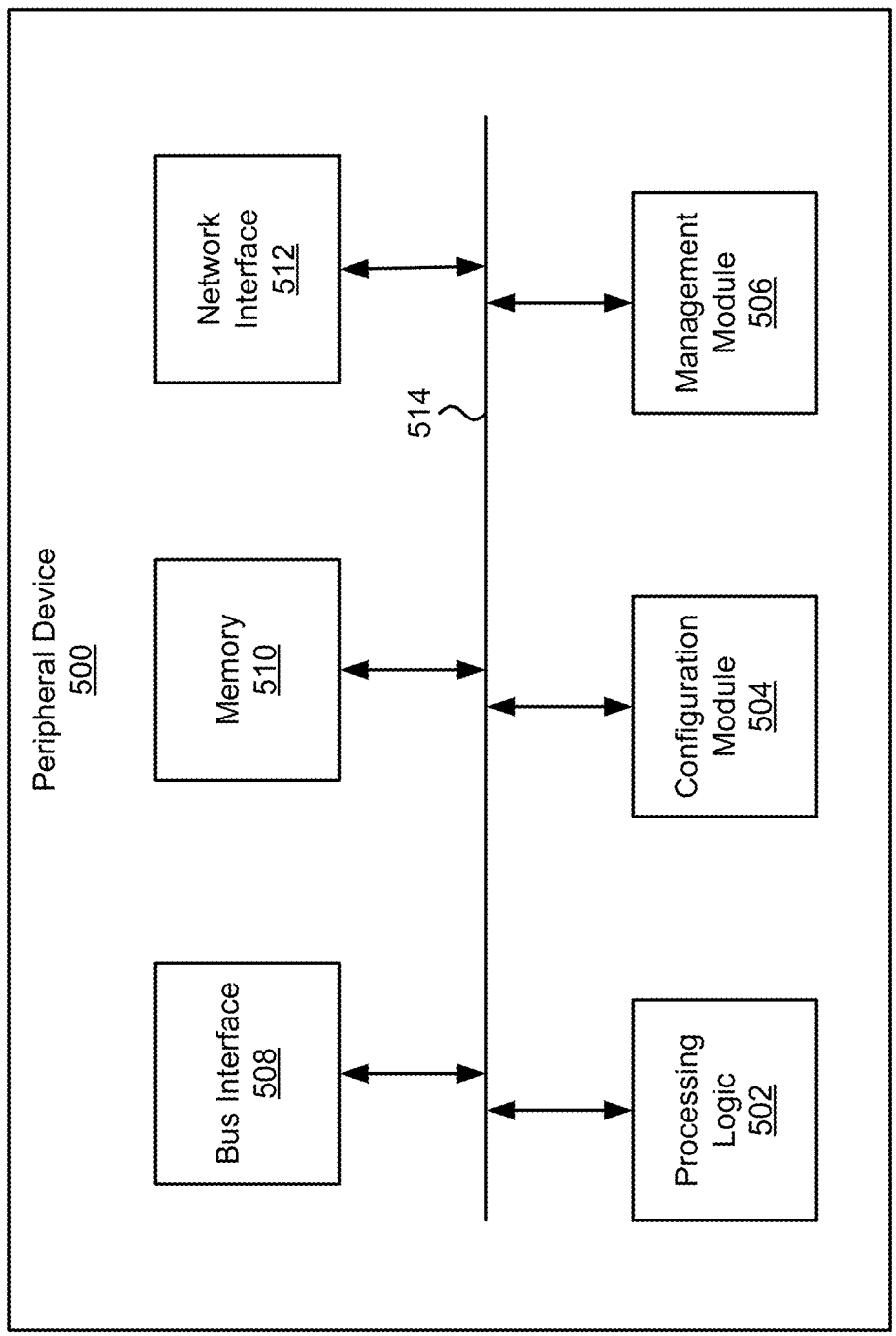
FIG. 5 illustrates an example of a peripheral device.

FIG. 5 illustrates an example of a peripheral device 500. Functionality and/or several components of the peripheral device 500 may be used without limitation with other examples disclosed elsewhere in this disclosure, without limitations. A peripheral device 500 may facilitate processing of packets and/or forwarding of packets from the peripheral device 500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the peripheral device 500 may be the recipient and/or generator of packets. In some implementations, the peripheral device 500 may modify the contents of the packet before forwarding the packet to another device. The peripheral device 500 may be a peripheral device coupled to another computer device, a switch, a router or any other suitable device enabled for receiving and forwarding packets.

In one example, the peripheral device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. In some implementations, the peripheral device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the peripheral device 500, while in other cases some or all of the memory may be external to the peripheral device 500. The memory 510 may store an operating system comprising executable instructions that, when executed by the processing logic 502, provides the execution environment for executing instructions providing networking functionality for the peripheral device 500. The memory may also store and maintain several data structures and routing tables for facilitating the functionality of the peripheral device 500.

In some implementations, the configuration module 504 may include one or more configuration registers. Configuration registers may control the operations of the peripheral device 500. In some implementations, one or more bits in the configuration register can represent certain capabilities of the peripheral device 500. Configuration registers may be programmed by instructions executing in the processing logic 502, and/or by an external entity, such as a host device, an operating system executing on a host device, and/or a remote device. The configuration module 504 may further include hardware and/or software that control the operations of the peripheral device 500.

In some implementations, the management module 506 may be configured to manage different components of the peripheral device 500. In some cases, the management module 506 may configure one or more bits in one or more configuration registers at power up, to enable or disable certain capabilities of the peripheral device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as PCI based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the peripheral device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the peripheral device 500 may include multiple network interface modules, each configured to communicate with a different network. For example, in these implementations, the peripheral device 500 may include a network interface module for communicating with a wired Ethernet network, a wireless 802.11 network, a cellular network, an Infiniband network, etc.

The various components and modules of the peripheral device 500, described above, may be implemented as discrete components, as a System on a Chip (SoC), as an ASIC, as an NPU, as an FPGA, or any combination thereof. In some examples, the SoC or other component may be communicatively coupled to another computing system to provide various services such as traffic monitoring, traffic shaping, computing, etc.

Figure 6:
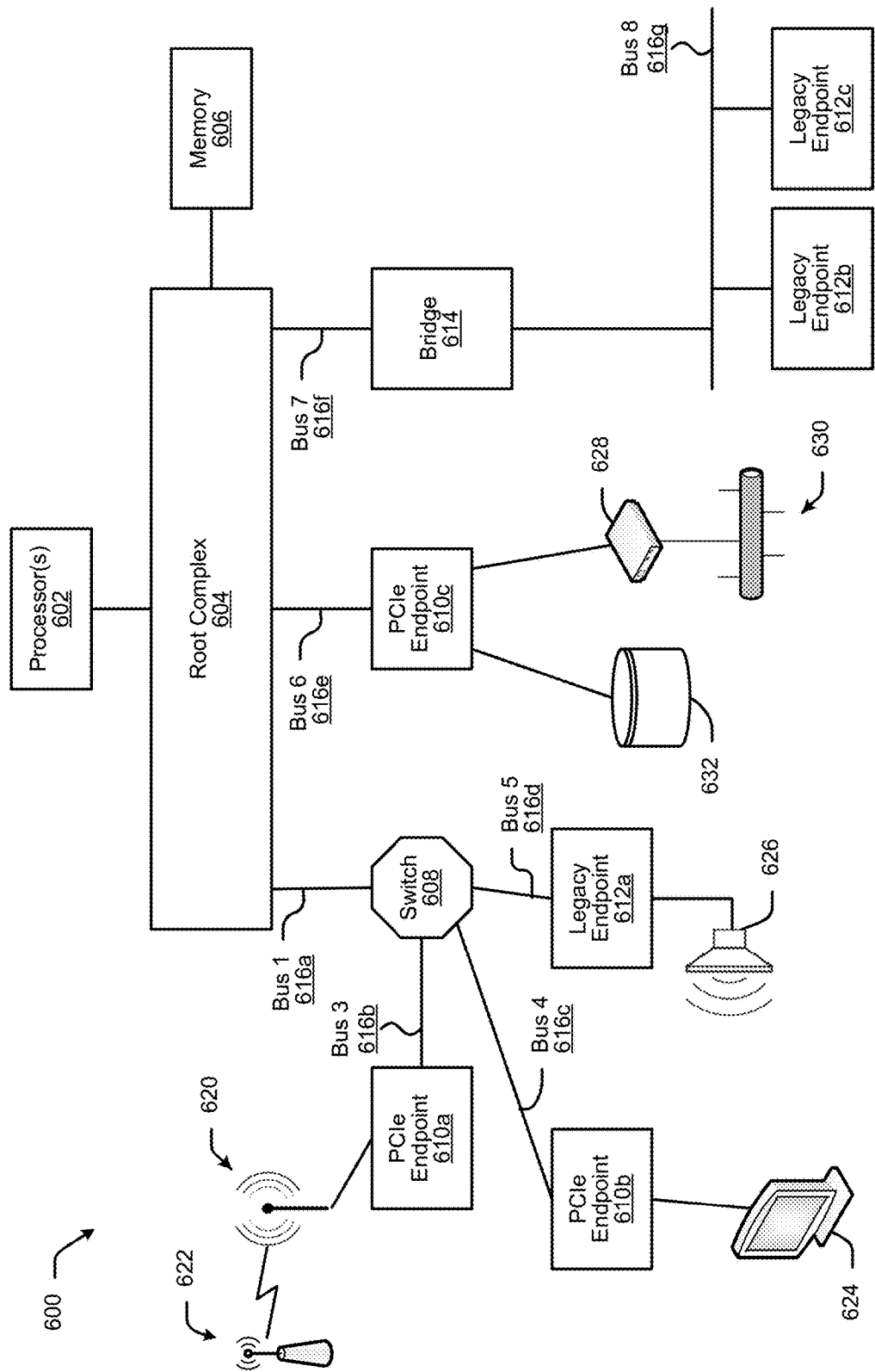
FIG. 6 illustrates an example of a computing system that includes multiple peripheral devices.

FIG. 6 illustrates an example of a computing system 600 that includes multiple peripheral devices. Peripheral devices may include hardware devices and/or devices that include a combination of hardware and software, which can be attached to a computing system to add functionality to the computing system 600. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example of FIG. 6 illustrates a computing system 600 that includes peripheral devices that implement one or more variations of the PCI standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols including the original PCI standard, PCI-X, AGP, and PCIe (also referred to as PCI-XP). The term "PCI" or "PCI-based" may be used herein to describe any protocol in the PCI family of bus protocols. The peripheral devices illustrated in FIG. 6 can also include peripheral devices that implement bus protocols that are based on a PCI bus protocol.

In the example shown in FIG. 6, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 600 may include one or more processors 602, a root complex 604, a memory subsystem 606, a switch 608, a bridge 614, and a number of peripheral devices. In this example, the peripheral devices include PCIe endpoints 610a-c and legacy endpoints 612a-c. The processors 602 may be general purpose computing devices such as are manufactured by Intel®, AMD®, ARM®, Qualcomm®, an others. The processors 602 are generally capable of executing software code. A processor may include multiple processing cores.

The root complex 604 may be a hardware device or a hardware and software device that connects the processors 602 and the memory subsystem 606 to the peripheral devices. The peripheral devices may be connected directly to the root complex 604. For example, the PCIe endpoint 610*c* is connected directly to the root complex 604. Alternatively or additionally, the peripheral devices may be connected to the root complex 604 through a switch 608. A bridge 614 may also be connected to the root complex 604. The root complex 604 may forward transactions to the processors 602 and direct responses from the processors 602 back to the peripheral devices. The root complex 604 may further generate transactions on behalf of the processors 602, and forward responses to those transactions back to the processors 602. In some cases, the root complex 604 may also route transactions from one peripheral device to another, and/or between peripheral devices, switches, and bridges. The root complex 604 may provide services for the computer system 600, such as a hot plug controller, a power management controller, an interrupt controller, and/or error detection and reporting. In some implementations, the root complex 604 may be implemented as part of a host system that includes one or more integrated processors. In some cases, memory may also be integrated into the host system.

The memory subsystem 606 may provide temporary or long-term storage for data that may be used by the computing system 600. The memory subsystem 606 may include Dynamic Random Access Memory (DRAM), Synchronous DRAM (SDRAM), and/or Double Data Rate (DDR), among others. In some cases, the memory subsystem 606 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 604 may include a memory controller to manage transactions to and from the memory subsystem 606. In other implementations, the processors 602 may include a memory controller. Alternatively or additionally, the computing system 600 may include an external memory controller in communication with either the processors 602, the root complex 604, or both the processors 602 and the root complex 604, and the memory subsystem 606.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X. Though not illustrated here, the computing system 600 may further include peripheral devices that implement another bus standard, such as for example, Small Computer System Interface (SCSI), Serial ATA (SATA), or Parallel ATA (PATA), among others.

The switch 608 functions as a multi-port connecter between various devices, including the root complex 604, peripheral devices, and possibly other switches and bridges. The switch 608 may route transactions between any of the devices connected to it. For example, the switch 608 may route transactions between the PCIe endpoints 610*a-b* and the legacy endpoint 612*a*, and between the various endpoints 610*a-b*, 612*a* and the root complex 604. The switch 608 may also provide arbitration to prioritize incoming and outgoing transactions. Devices connected to the switch 608 may treat the switch 608 as another requester and/or completer. Though not illustrated here, switches can also be connected to other switches to further expand the number of peripheral devices that can be connected to the computing system 600.

The bridge 614 may provide connectivity to other busses or switching fabrics. The other busses or switching fabrics may implement a PCI variant or another protocol. For example, in the example of FIG. 6, the bridge 614 provides connectivity to a bus implementing the original PCI standard. The bridge 614 may include mechanisms to translate from one bus protocol, such as the original PCI standard, to another protocol, such as PCIe.

Components in the computing system 600 may be connected through a shared bus. For example, in the illustrated example, the legacy endpoints 612*b-c* are connected to a shared PCI bus 616*g*. Alternatively or additionally, peripheral devices may be connected to the computing system 600 in a switching fabric topology. The interconnected devices illustrated in FIG. 6, including the root complex 604, the switch 608, the bridge 614, and the PCIe endpoints 610-*c*, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 6, the switch 608 is connected to the root complex 604 with Bus 1 616*a* and the PCIe endpoint 610*c* is connected to the root complex with Bus 6 616*e*. Similarly, the bridge 614 is connected to the root complex with Bus 7 616*f*. Each of the PCIe endpoints 610*a-b* and the legacy endpoint 612*a* are also connected to the switch 608 with individual busses 616*b-d*. The connections between each of the root complex 604, the switch 608, the bridge 614, the PCIe endpoints 610*a-c* and the legacy endpoint 612*a* are point-to-point because each of the busses 616*a-g* are not shared with another device. Furthermore, a packet directed from one device to another (for example, from the root complex 604 to the PCIe endpoint 610*a*) is routed directly to its destination.

In some implementations, the connections between the devices in the computing system 600 may be numbered. For example, in the illustrated example, the connection between the switch 608 and the root complex 604 is labeled Bus 1 616*a* (Bus 0 may be internal to the root complex 604). Similarly, each of the busses connecting the PCIe endpoints 610*a-b* and the legacy endpoint 612*a* to the switch 608 are labeled Bus 3 616*b*, Bus 4 616*c*, and Bus 5 616*d*, respectively (Bus 2 may be internal to the switch 608). Furthermore, the connection between the root complex 604 and the PCIe endpoint 610*c* may be labeled Bus 6 616*e*, while the connection between the root complex and the bridge 614 may be labeled Bus 7 616*f*. Finally, the shared bus downstream from the bridge 614 may be labeled Bus 8 616*g*. In most cases the numbering of the busses is arbitrary, though bus numbers are generally assigned in a logical fashion. For example, Bus 0 may be located within the root complex 604, and the bus label may increment as the distance between the bus and the root complex 604 increases.

As noted above, peripheral devices may add to and/or modify the functionality of the computing system 600. For example, one PCIe endpoint 610*a* may implement a Wi-Fi adapter 620. Using the Wi-Fi adapter 620, the computing system 600 may be able to communicate wirelessly with a wireless access point 622, and thereby access a network. As another example, another PCIe endpoint 610b may implement a video card. A video card may include a port to connect a monitor 624 or other display device. As a further example, the computing system 600 may include a legacy endpoint 612a that implements a sound card. A sound card may include a port or jack that accepts a plug for a speaker 626 or other audio output device.

In some cases, a PCIe endpoint may be a multi-function device, that is, a device that provides the services of multiple devices. For example, the PCIe endpoint 610c may include an Ethernet adapter, and provide a connection to a gateway device 628, such as a DSL or cable modem. The PCIe endpoint 610c may also include a storage adapter, and provide a connection to a storage device 632. The one PCIe endpoint 610c thus may provide access to a network 630, as well as access to a storage device 632. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 610c may be a mass storage controller, while Function 1 may be a network interface.

When a computing system such as computing system 600 illustrated in FIG. 6 initially powers up, the processors 602 may be unaware of any peripheral devices that are connected to the system. The processors 602 may be aware of the root complex 604, and possibly also that the root complex 604 is connected to one or more busses. To learn about the rest of the system, the processors 602 may execute a process to scan and configure the system. This process may be referred to as an enumeration process. The specific process of scanning for, locating, and identifying peripheral devices may be called discovery or discovering. During an enumeration process, software executing on the processors 602 may first scan each of the busses 616a, 616e, 616f connected to the root complex 604, and identify the switch 608, the PCIe endpoint 610c, and the bridge 614. Upon discovering the switch 608, the processors 602 may next scan the busses 616b-d connected to the switch 608. The processors 602 thereby discover the PCIe endpoints 610a-c and the legacy endpoint 612a. Upon discovering the bridge 614, the processors 602 may also scan Bus 8 616g; however, the bridge 614 may translate the scanning instructions to the protocol implemented by Bus 8 616g.

While scanning the busses, or possibly after, the processors 602 may also transmit configuration transactions to each of the devices it discovers. Configuration may include, for example, assigning one or more address spaces. For example, PCI devices typically include one or more of a memory address space and/or an Input/Output (I/O) address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 602 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 602 may also read information from configuration registers. For example, the PCIe endpoint 610c may include a configuration register that indicates that it has two functions. The PCIe endpoint 610c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 608 and the bridge 614 also include a configuration space with configuration registers. In such implementations, the processors 602 may discover the switch and bridge functionality by reading configuration registers in the switch 608 and the bridge 614. The switch 608 and the bridge 614 may also be configured by the processors 602, for example with bus and device numbers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for performing a read transaction via a link between a requester device and a Peripheral Component Interface (PCI) device, the computer-implemented method comprising:
   receiving, by a device driver operating on the requester device, a read request including a target address at which target data is to be read on the PCI device, the read request having an initial length;
   increasing, by the device driver, the initial length of the read request by an additional length, wherein the additional length is for exchanging information with the PCI device, wherein increasing the initial length by the additional length causes the read request to have an extended length that is greater than the initial length;
   sending, by the device driver, the read request to the PCI device via the link;
   receiving, by a PCI controller of the PCI device, the read request via the link;
   reading, by the PCI controller, the target data at the target address at a readable memory of the PCI device;
   determining, by the PCI controller, that the read request has the extended length;
   determining, by the PCI controller, error data regarding the target data to be generated based on the additional length;
   generating, by the PCI controller, the error data by analyzing the target data;
   generating, by the PCI controller, a read response comprising the target data and the error data;
   sending, by the PCI controller, the read response to the requester device via the link;
   receiving, by the device driver, the read response via the link; and
   reading, by the device driver, the error data.

2. The computer-implemented method of claim 1, wherein the requester device includes a host processor.

3. The computer-implemented method of claim 1, further comprising:
   prior to sending the target data to an application operating on the requester device, performing a resolution operation based on the error data.

4. The computer-implemented method of claim 1, wherein the additional length indicates that the error data is to include data regarding a location or a quantity of one or more errors in the target data.

5. A computer-implemented method comprising:
   receiving, by a device driver operating on a requester device, a read request including a target address at which target data is to be read on a completer device, the read request having an initial length indicating an amount of data to be read;
   increasing the initial length of the read request by adding an additional length to produce an extended length, wherein the additional length is for exchanging information with the completer device;
   sending the read request to the completer device via a link, wherein the completer device is configured to, upon receiving the read request, generate a read response comprising the target data and information about the target data, wherein a length of the target data is equal to the initial length and a length of the information about the target data is less than or equal to the additional length;
   receiving the read response; and
   reading the information about the target data.

6. The computer-implemented method of claim 5, wherein the requester device includes a host processor and the completer device includes a peripheral device.

7. The computer-implemented method of claim 5, wherein the requester device includes a first peripheral device and the completer device includes a second peripheral device.

8. The computer-implemented method of claim 5, further comprising:
   performing a resolution operation based on the information about the target data.

9. The computer-implemented method of claim 8, wherein the resolution operation includes:
   sending a second read request for the target data to the completer device via the link;
   sending the second read request for the target data to a second completer device via a second link;
   sending the information about the target data to an application;

notifying the application that the information about the target data was received from the completer device; or modifying the target data based on the information about the target data.

10. The computer-implemented method of claim 9, further comprising:

subsequent to performing the resolution operation, sending the target data to the application.

11. The computer-implemented method of claim 5, wherein the additional length indicates that the information about the target data is to include data regarding a location or a quantity of one or more errors in the target data.

12. The computer-implemented method of claim 5, wherein the read request is received by the device driver from an application operating on the request device.

13. A computing device, comprising:

one or more processors;

a memory comprising instructions, wherein the instructions, when executed by the one or more processors, cause the one or more processors to perform operations including:

receiving a read request including a target address at which target data is to be read, the read request having an extended length;

determining an initial length of the read request by subtracting from the extended length an additional length, wherein the additional length is for exchanging information with a completer device;

executing the read request with the initial length to obtain the target data;

determining information about the target data;

generating a read response, the read response having the extended length, wherein the read response includes the target data and the information about the target data; and transmitting the read response.

14. The computing device of claim 13, wherein the computing device comprises a peripheral device.

15. The computing device of claim 13, wherein the read request is received from a requester device executing a device driver for the computing device.

16. The computing device of claim 15, wherein the read request is received by the device driver from an application.

17. The computing device of claim 13, wherein the read request is received from a peripheral device.

18. The computing device of claim 13, wherein the information about the target data is appended to the target data in the read response.

19. The computing device of claim 13, wherein the additional length indicates that the information about the target data is to include data regarding a location or a quantity of one or more errors in the target data.

20. The computing device of claim 13, wherein the information about the target data further includes information about a state of the computing device.

* * * * *